(12) United States Patent
Hirsa et al.

(10) Patent No.: US 8,148,706 B2
(45) Date of Patent: Apr. 3, 2012

(54) PINNED-CONTACT OSCILLATING LIQUID LENS AND IMAGING SYSTEM

(75) Inventors: Amir H. Hirsa, Clifton Park, NY (US); Carlos A. Lopez, Coahulla (MX)

(73) Assignee: Rensselaer Polytechnic Institute, Troy, NY (US)

( * ) Notice: Subject to any disclaimer, the term of this patent is extended or adjusted under 35 U.S.C. 154(b) by 547 days.

(21) Appl. No.: 12/487,328

(22) Filed: Jun. 18, 2009

(65) Prior Publication Data

US 2009/0316003 A1 Dec. 24, 2009

Related U.S. Application Data

(60) Provisional application No. 61/073,397, filed on Jun. 18, 2008.

(51) Int. Cl.
*G01N 15/06* (2006.01)
*G02B 1/06* (2006.01)
(52) U.S. Cl. ........................ 250/573; 359/665
(58) Field of Classification Search .......... 250/573–577, 250/559.21; 348/187, 360; 347/21, 44, 65, 347/102; 359/210.1, 665, 666
See application file for complete search history.

(56) References Cited

U.S. PATENT DOCUMENTS

| 4,168,482 | A | 9/1979 | Sternberg |
| 7,245,440 | B2 | 7/2007 | Peseux |
| 7,264,162 | B2 | 9/2007 | Barkman |
| 7,359,124 | B1 | 4/2008 | Fang |
| 7,369,321 | B1 | 5/2008 | Ren et al. |
| 7,440,193 | B2 | 10/2008 | Gunasekaran et al. |
| 7,545,430 | B2 * | 6/2009 | Nakagawa ............ 348/335 |
| 2007/0030573 | A1 | 2/2007 | Batchko et al. |
| 2008/0019015 | A1 | 1/2008 | Fernandez et al. |

(Continued)

FOREIGN PATENT DOCUMENTS

EP  1 835 313 A1  9/2007

(Continued)

OTHER PUBLICATIONS

"Micro Light Sabers—Tunable Liquid Lens Can Make a Directional Movable Laser", (http://www.scientificblogging.com/news_articles/) (May 11, 2009).

(Continued)

*Primary Examiner* — Georgia Y Epps
*Assistant Examiner* — Don Williams
(74) *Attorney, Agent, or Firm* — Kevin P. Radigan, Esq.; Heslin Rothenberg Farley & Mesiti P.C.

(57) ABSTRACT

An oscillating liquid lens and imaging system and method employing the lens are provided. The liquid lens includes a substrate with a channel opening extending therethrough between a first and second surface. A liquid drop is disposed within the channel and is sized with a first droplet portion, including a first capillary surface, protruding away from the first surface, and a second droplet portion, including a second capillary surface, protruding away from the second surface. The liquid lens further includes an oscillator operatively coupled to either the first droplet portion or the second droplet portion for oscillating the liquid drop within the channel. The imaging system, in addition to the oscillating liquid lens, also includes an image sensor coupled to an image path which passes through the first and second droplet portions for capturing one or more images through the oscillating liquid drop.

20 Claims, 9 Drawing Sheets

U.S. PATENT DOCUMENTS

2008/0245872 A1 10/2008 Good
2009/0052000 A1 2/2009 Sakata
2009/0072037 A1 3/2009 Good et al.

FOREIGN PATENT DOCUMENTS

EP          1 870 740 A1   12/2007
WO    WO 2006/009514 A1    1/2006

OTHER PUBLICATIONS

Christensen, B., "Tunable Liquid Lens Glasses for the Masses", Technovelgy.com, (http://www.technovelgy.com/), (May 28, 2009).
Ren et al., "Tunable-Focus Liquid Lens Controlled Using a Servo Motor", Optics Express, vol. 14, No. 18 (Sep. 4, 2006).
Lee et al., "Focal Tunable Liquid Lens Integrated with an Electromagnetic Actuator", Applied Physics Letters, vol. 90, No. 12, 121129 (2007).
Ren et al., "Adaptive Dielectric Liquid Lens", Optics Express, vol. 16, No. 19 (Sep. 15, 2008).
"Fluid Lenses Fee the Pressure", Physicsword.com (http://physicsword.com/cws/article/news/24119) (May 28, 2009).
Cronis et al., "Tunable Liquid-Filled Microlens Array Integrated with Microfluidic Network", Optics Express, vol. 11, No. 19 (Sep. 22, 2003).
Mao et al., "Hydrodynamically Tunable Optofluidic Cylindrical Microlens" Lab Chip, vol. 7, 1303-1308 (2009).
Huang, S., "Properties of a Liquid-Drip Variable Lens", (http://laser.physics.sunysb.edu/) (May 29, 2009).
Lopez et al., "Fast Focusing Using a Pinned-Contact Oscillating Liquid Lens", Nature Photonics, vol. 2, No. 10 (Oct. 2008).
Hirsa et al., "Low-Dissipation Capillary Switches at Small Scales", Applied Physics Letters, vol. 86, No. 1, 014106 (2005).
Lopez et al., "Electrochemically Activated Adaptive Liquid Lens" Applied Physics Letters, vol. 87, No. 13, 134102 (2005).
Moran et al., "Fluidic Lenses with Variable Focal Length", Applied Physics Letters, vol. 88, No. 4, 041120 (2006).
Tsai et al., "Miniaturized Universal Imaging Device Using Fluidic Lens", Optics Letters, vol. 33, No. 3 (Feb. 1, 2008).
Wang et al., "Variable Focusing Microlens Chip for Potential Sensing Applications", IEEE Sensor Journal, vol. 7, No. 1 (Jan. 2007).
Lopez et al., "Varifocal Optics: Oscillating Liquid Lens Focuses in a Hundredth of a Second", Nature Photonics Advanced Online Publication (Sep. 21, 2008).
Kuiper et al., "Variable-Focus Liquid Lens for Miniature Cameras", Applied Physics Letters, vol. 85, No. 7 (Aug. 2004).
VonWaldkirch et al., "Oscillating Fluid Lens in Coherent Retinal Projection Displays for Extending Depth of Focus", Optics Communications, vol. 253, pp. 407-418 (2005).
Stan, C., "Liquid Optics: Oscillating Lenses Focus Fast", Nature Photonics, vol. 2 (Oct. 2008).

* cited by examiner

PINNED-CONTACT OSCILLATING LIQUID LENS AND IMAGING SYSTEM

CROSS-REFERENCE TO RELATED APPLICATIONS

This application claims the benefit of U.S. Provisional Application No. 61/073,397, filed Jun. 18, 2008, which is hereby incorporated herein by reference in its entirety.

STATEMENT REGARDING FEDERALLY SPONSORED RESEARCH OR DEVELOPMENT

This invention was made with support from the National Science Foundation of the United States of America, under Grant No. DMII-0500408. Accordingly, the United States government may have certain rights in the invention.

TECHNICAL FIELD

The present invention relates in general to variable optical devices, and more particularly, to a pinned-contact oscillating liquid lens, and to imaging systems and imaging methods employing the same.

BACKGROUND OF THE INVENTION

Optical focusing is often a slow process due to the delay inherent in moving mechanically a camera's lens until an image is in focus.

Although liquids are considered an exotic choice for lens material, there is interest in liquid lenses for applications in adaptive optics requiring fast response or for applications that require miniature, cost-effective optics. The interfaces of liquids have good optical qualities because of surface tension, which dominates gravity in the sub-milliliter scale, creating interfaces that are nearly perfectly spherical and optically smooth. The demand for high-performance consumer products such as cell phones and video recorders, as well as applications in surveillance and defense, has spurred an intense search for viable, lightweight adaptive optics. There is thus much interest in the use of liquids for adaptive optics.

Existing strategies use liquid lenses after transient oscillations have dampened. The challenge with this existing liquid lens approach is two-fold. The first issue is to overcome the liquid inertia to enable a rapid state change, and the second, is to minimize the time it takes for transients induced during stoppage to subside. Many systems use brute force activation methods to effect a shape change, creating undesired transient motion, which then necessitates a high-dissipative media to dampen them out.

SUMMARY OF THE INVENTION

The shortcomings of the prior art are overcome and additional advantages are provided through the provision, in one aspect, of a liquid lens. The liquid lens includes a substrate defining at least one channel extending through the substrate between a first surface and a second surface thereof. For each channel of the at least one channel defined in the substrate, a liquid drop is disposed within the channel. Each liquid drop includes a first droplet portion comprising a first capillary surface protruding away from the first surface of the substrate and a second droplet portion comprising a second capillary surface protruding away from the second surface of the substrate. The liquid lens also includes an oscillator operatively coupled to one of the first droplet portion or the second droplet portion for oscillating the liquid drop within the channel, thereby oscillating the first and second droplet portions of the liquid drop.

In another aspect, an imaging system is provided which includes a liquid lens and at least one image sensor. The liquid lens includes a substrate defining at least one channel extending through the substrate between a first and second surface thereof. A liquid drop is disposed within each channel of the at least one channel defined within the substrate. The liquid drop includes a first droplet portion comprising a first capillary surface protruding away from the first surface of the substrate and a second droplet portion comprising a second capillary surface protruding away from the second surface of the substrate, wherein the first droplet portion and the second droplet portion are interconnected through the channel. The liquid lens further includes an oscillator operatively coupled to one of the first droplet portion or the second droplet portion of each liquid drop for oscillating the liquid drop within the respective channel, and hence, for oscillating the first and second droplet portions of the liquid drop. The at least one image sensor is coupled to at least one image path passing through the first and second droplet portions of the oscillating liquid drop(s) of the liquid lens for capturing an image through the first and second droplet portions of the oscillating liquid drop.

In yet another aspect, an imaging method is provided which includes: oscillating a liquid lens, the liquid lens comprising a substrate defining a channel extending between a first surface and a second surface thereof, with a liquid drop being disposed within the channel, the liquid drop comprising a first droplet portion including a first capillary surface protruding away from the first surface of the substrate and a second droplet portion comprising a second capillary surface protruding away from the second surface of the substrate, wherein the first and second droplet portions of the liquid drop are connected through the channel, and the oscillating comprises applying an oscillatory force to one of the first droplet portion or the second droplet portion to oscillate the liquid drop within the channel; and capturing at least one image through the first and second droplet portions of the oscillating liquid lens.

In a further aspect, a method of fabricating a liquid lens is provided which includes: obtaining a non wetting substrate; defining at least one channel in the non wetting substrate extending from a first surface to a second surface thereof; and for each channel of the at least one channel defined in the non wetting substrate, disposing a liquid drop within the channel with a first droplet portion of the liquid drop comprising a first capillary surface protruding away from the first surface of the substrate and a second droplet portion of the liquid drop comprising a second capillary surface protruding away from the second surface of the substrate, wherein the first and second droplet portions of the liquid drop are connected through the channel.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Disclosed herein is a significantly faster focusing paradigm, wherein instead of moving a lens to a final position, the shape of the lens described herein is continuously oscillated, and thus its focal length is continuously oscillated. In a period of oscillation, the focal length evolves through its full range of values, and a synchronized high-speed sensor is employed to capture sharp images at different focal points. Focusing in the range of 0.01 seconds has been experimentally achieved, which was less than the period of oscillation. This was achieved by vibrating at its resonant frequency a small (e.g., millimeter-size) liquid lens made of water.

Described herein by way of example is a harmonically-driven liquid lens with an oscillating focal length, which can capture any image plane in a given range by grabbing the image "in synch" with the oscillations. By oscillating the lens, the task of changing the focal length is effectively transformed from a mechanical manipulation to an electronic timing of image capture, which can be achieved significantly more quickly. High-fidelity imaging is demonstrated at 100 Hz for a milliliter-scaled liquid lens, driven at resonance and featuring pinned-contact lines. Theoretical predictions show that significantly faster responses are possible with scaled-down lenses.

Reference is made below to the drawings, which are not drawn to scale and which are simplified for ease of understanding, wherein the same reference numbers used throughout different figures designate the same or similar components.

Figure 1:
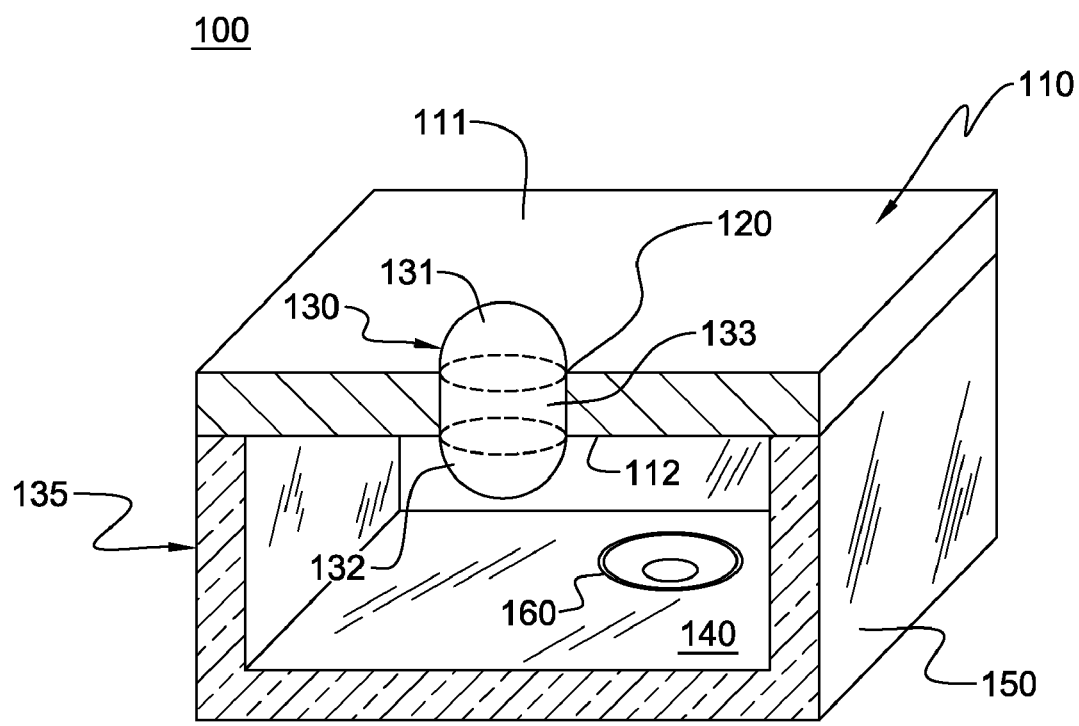
FIG. 1 is a cross-sectional illustration of one embodiment of an oscillating liquid lens, in accordance with an aspect of the present invention.

FIG. 1 illustrates one embodiment of an oscillating liquid lens, generally denoted 100, in accordance with an aspect of the present invention. Oscillating liquid lens 100 includes a substrate 110 having opposing first and second surfaces 111, 112, respectively. Substrate 110 is non wetting, comprising, in one example, a hydrophobic material, such as polytetrafluoroethylene (e.g., Teflon). The substrate may itself be formed of the non wetting material, or be coated with the non wetting material, including within the one or more channels described below. In FIG. 1, a single channel 120 is shown defined within substrate 110 extending between first surface 111 and second surface 112 thereof. This single channel is depicted by way of example only. In other implementations, an array of multiple channels may be provided, each with a common transverse cross-sectional area (e.g., a common diameter), or with different transverse cross-sectional areas (e.g., different diameters), as desired. By providing channels with different cross-sectional areas, or different amounts of liquid protruding from channels of the same cross-sectional area, an array of liquid drops may achieve different focusing characteristics for the liquid lens.

Within each channel defined in the substrate, a liquid drop 130 is disposed. By way of example, each channel might comprise a cylindrical-shaped hole through the substrate, and each drop a drop of transparent liquid such as, for example, water, an aqueous salt solution, or an aqueous ferro-fluid. Other liquids may also be employed. Because the substrate is non wetting (e.g., hydrophobic), the liquid drop does not spread on the surface of the substrate, and the contact line between the liquid, air and substrate is pinned at the edges of the hole. As depicted, liquid drop 130 is characterized as including a first droplet portion 131 comprising a first capillary surface which protrudes away from first surface 111 of substrate 110, and a second droplet portion 132 comprising a second capillary surface which protrudes away from second surface 112 of substrate 110. The first and second capillary surfaces are liquid-to-gas interface surfaces, which as noted above, are nearly perfect spherical shapes due to surface tension. The first and second droplet portions of liquid drop 130 are directly connected (i.e., interconnected) through a liquid body portion 133 of liquid drop 130 disposed within channel 120 of substrate 110.

The opposing curvatures of the droplet portions create a spring-like force that makes the liquid drop a natural oscillator as force acts on its mass. In accordance with an aspect of the present invention, it is demonstrated that for a range of parameters, the liquid drop can be driven harmonically, such that the shapes of the droplet portions are essentially spherical and hence suitable for optics. Also, forcing the liquid lens at resonance allows the oscillatory motion to be sustainable with very little energy input. Dissipation associated with moving contact lines, viscous or otherwise, is minimized by pinning the contact lines using the hydrophobic substrate. Furthermore, the oscillations are made to occur at time- and length-scales where capillarity balances inertia, as opposed to viscosity. The natural frequency of the liquid lens scales with the radius of the lens as $R^{-3/2}$, and, as a result, a very-high-frequency response can be obtained with a modest size lens.

As illustrated in FIG. 1, the liquid lens further includes an oscillator 135 operatively coupled to the first droplet portion or the second droplet portion for oscillating the liquid drop within the channel. In the embodiment of FIG. 1, oscillator 135 includes a cavity 140 formed about the second droplet portion 132 of liquid drop 130 by mounting a transparent housing 150 to second surface 112 of substrate 110. Cavity 140 is a sound chamber, with a speaker 160 being provided in one wall of transparent housing 150 to facilitate application of an oscillatory drive to the liquid drop via sound pressure. This sound drive mechanism is illustrated by way of one example only. More generally, the oscillator (or oscillation drive) for the liquid lens can be achieved via air pressure (e.g., generated by the depicted speaker), a piezo device (or other electromechanical device), a ferro-fluid drive (if the liquid drop is magnetic), or an electro-static drive (if the liquid drop is charged).

Figure 2A:
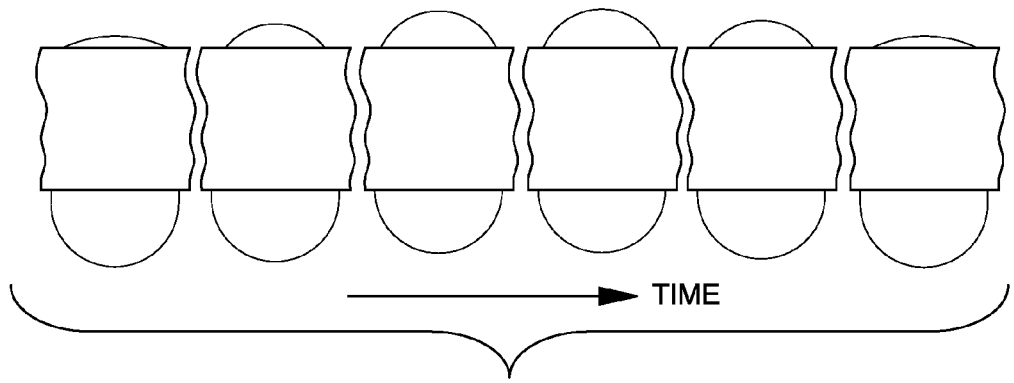
FIGS. 2A-2C each depict a time sequence of a pinned-contact oscillating liquid lens driven by an external applied pressure at resonance, wherein different forcing amplitudes are employed in FIGS. 2A, 2B & 2C, in accordance with an aspect of the present invention.
Figure 2B:
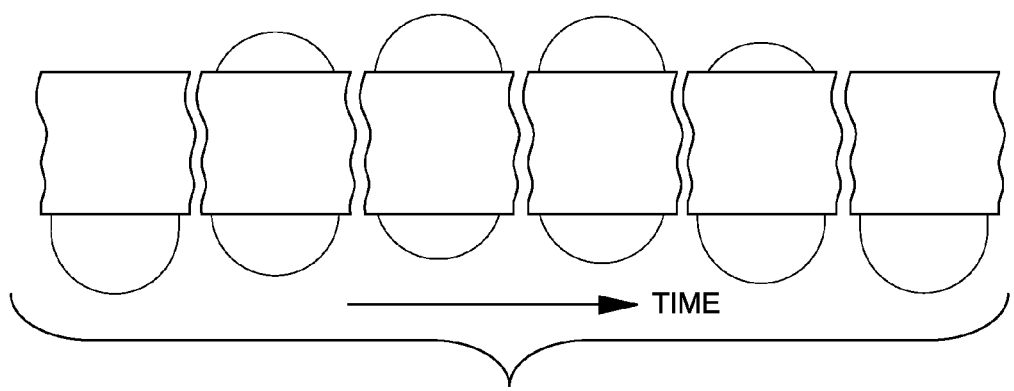
Figure 2C:
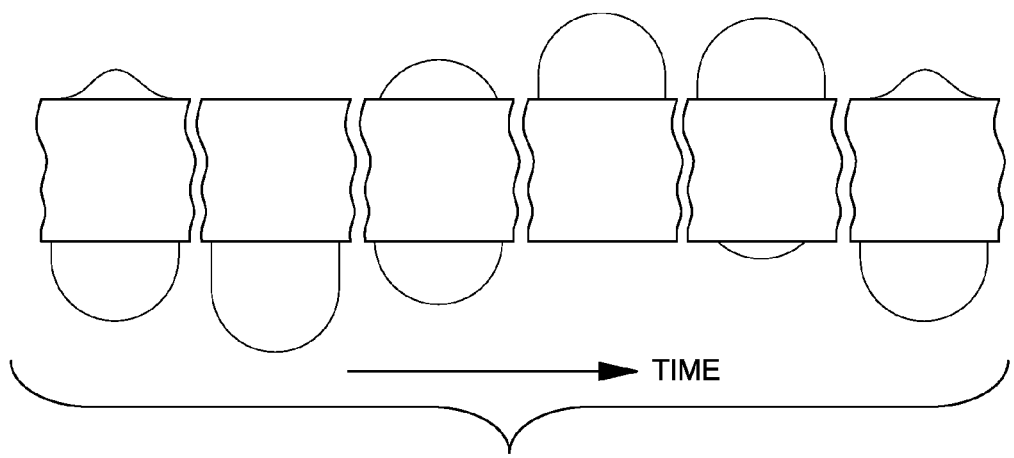

By oscillating air pressure on second droplet portion 132 of liquid drop 130, the liquid drop is pushed in (and pulled out) from the channel, with corresponding changes in the shapes of first droplet portion 131 and second droplet portion 132. This is illustrated in the time-elapsed sequences of FIGS. 2A, 2B and 2C, for different-applied pressures. Specifically, in these figures, the pinned-contact oscillating liquid lens is driven by an external pressure at resonance, but with different forcing amplitudes. The driving amplitudes are 5.5 Pa (5.4× $10^{-5}$ atm) for FIG. 2A, 23.4 Pa for FIG. 2B, and 31.7 Pa for FIG. 2C, wherein the volume of the liquid is 0.9 $V_s$, and is being driven at 49 Hz. The measured volume refers only to that of the protruding liquid portions (i.e., the droplet portions), where $V_s=(4/3)\pi R^3$. In FIGS. 2A-2C, the time between frames is 4 ms, and channel radius R is equal to 0.84 mm.

Figure 3A:
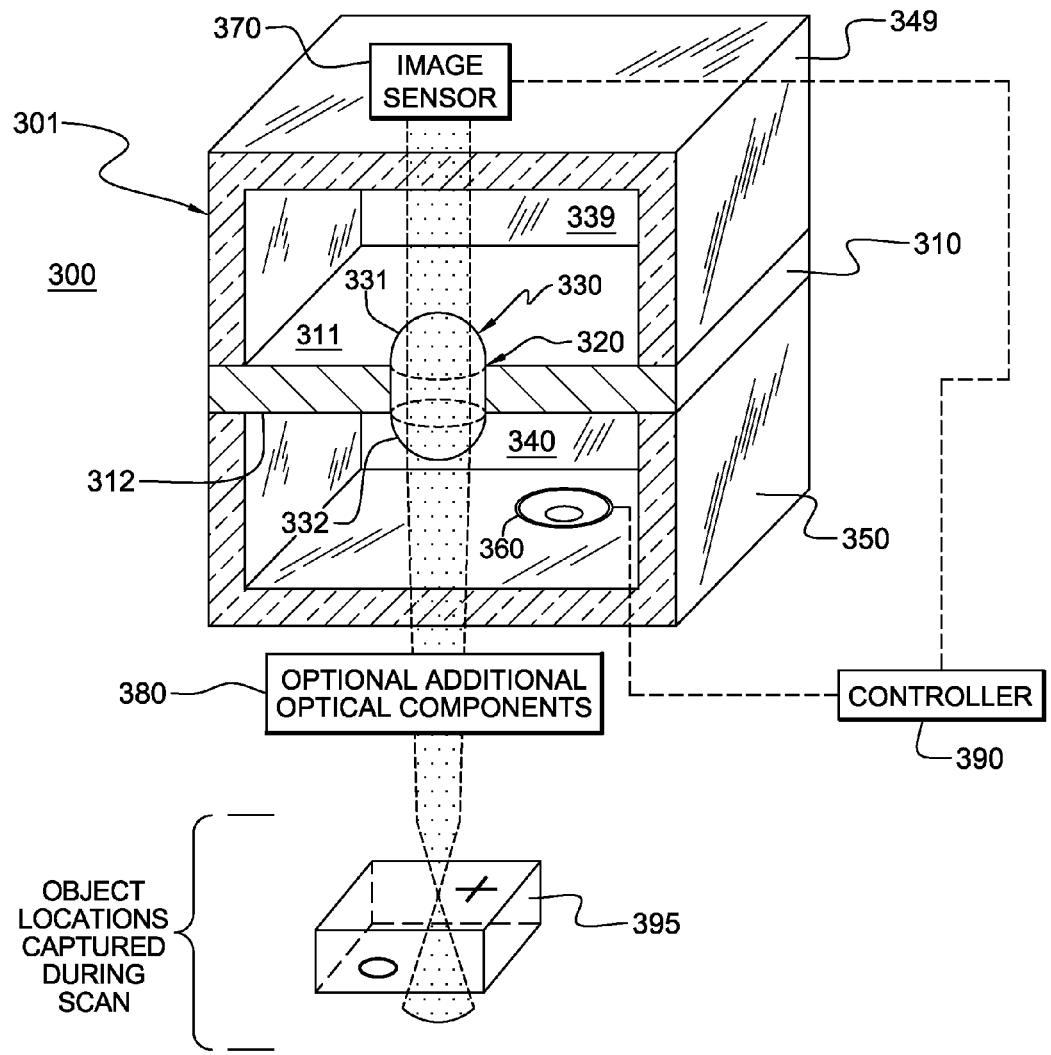
FIG. 3A is a partial cross-sectional illustration of one embodiment of an imaging system employing an oscillating liquid lens, and illustrating the top surface of an object being imaged in focus (by way of example), in accordance with an aspect of the present invention.

FIG. 3A depicts one embodiment of an imaging system, generally denoted 300, employing an oscillating liquid lens such as described above in connection with FIG. 1. In this embodiment, the liquid lens 301 includes a substrate 310 having at least one channel 320 defined therein extending between a first surface 311 and a second surface 312 thereof (One channel is again illustrated by way of example only.) A liquid drop 330 is disposed within each channel 320 defined in substrate 310. Substrate 310 is fabricated of a non wetting material such that the contact line between the liquid drop, air and the substrate is pinned at the edges of each channel. In one embodiment, the channel is a cylindrical-shaped channel extending through the substrate. Liquid drop 330 is sized with sufficient volume to define a first droplet portion 331 comprising a first capillary surface protruding away from first surface 311 of substrate 310, and a second droplet portion 332 comprising a second capillary surface protruding away from second surface 312 of substrate 310. As illustrated, a first chamber 339 is formed over first droplet portion 331 of liquid droplet 330 by sealing a first transparent housing 349 to substrate 310 and a second chamber 340 is formed over second droplet portion 332 of liquid drop 320 by sealing a second transparent housing 350 to substrate 310. (Note that alternate liquid lens fabrication embodiments may be employed by those skilled in the art, with the example depicted in FIG. 3A being presented by way of example only.) As in the liquid lens embodiment of FIG. 1, a speaker 360 is provided in transparent housing 350, meaning chamber 340 is a sound chamber. Speaker 360, which is one example of oscillatory drive, applies oscillating pressure to liquid drop 330, and in particular (in this embodiment) to second droplet portion 332 of liquid droplet 330. Note that the oscillation drive could be configured to (for example) apply pressure to either the second droplet portion or the first droplet portion of the liquid drop, as desired for a particular liquid lens application.

An image sensor 370 is disposed above transparent housing 349 and aligned with an image path passing through the liquid drop, and in particular, passing through the oscillating first droplet portion and second droplet portion of the liquid drop. In this embodiment, the image path further passes through transparent housing 350, and any additional optical components (such as a large aperture lens), which may optimally be employed with the oscillating liquid lens described herein. The resultant imaging system has a focal length within a defined range, wherein objects located within that range may be captured during scanning. Note that the image sensor 370 may comprise any appropriate imaging device. In one example, the image sensor is part of a digital camera or video recorder. A controller 390, comprising (for example) a general purpose computer, is provided with logic (as described below) to enable the capture of one or more in-focus images. As noted above, in an optical system with an oscillating focal length such as depicted in FIG. 3A, the task of focusing changes. Instead of manipulating the position of a lens of fixed shape, the timing of the image recording is to be synchronized with the oscillations of the lens, and pictures should be taken inside the narrow time interval during which the system is in focus. Fast electronic timing can be readily implemented using today's high-speed cameras. The result is a significantly faster adaptive lens than is possible with the mechanical movements of existing optics.

The oscillating liquid lens described herein is faster than the period of oscillation. By driving the lens at its resonant frequency, the lens interfaces remain spherical, and the amplitudes of the oscillations are maximized. The combination of oscillating-focal-length lenses with high-speed cameras also provides the ability for three-dimensional (3D) imaging. For example, a microscope objective based on an oscillating lens is capable of fast scanning at different depths inside a sample under investigation. A high-speed camera could acquire in a single lens oscillation period enough images to produce the 3D image by deconvolution. Such a system could also acquire 3D microscopy movies at a frame rate equal to the lens oscillation rate. As one example, the EX-F1 high-speed camera, marketed by Casio, could be employed with the oscillating liquid lens described herein.

Figure 3B:
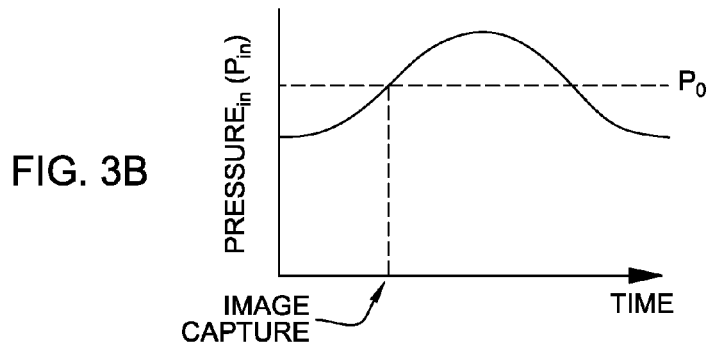
FIG. 3B graphically depicts one embodiment of harmonically-applied pressure versus time to the liquid drop in the liquid lens of FIG. 3A, in accordance with an aspect of the present invention.

In FIG. 3A, an object 395 is illustrated with an upper surface thereof shown in the instant focal plane of the oscillating liquid lens. FIG. 3B illustrates that in this example, the image is captured (by way of example only) at an equilibrium pressure $P_o$ (e.g., atmospheric pressure) within chamber 340 of the oscillating liquid lens 301.

Figure 4A:
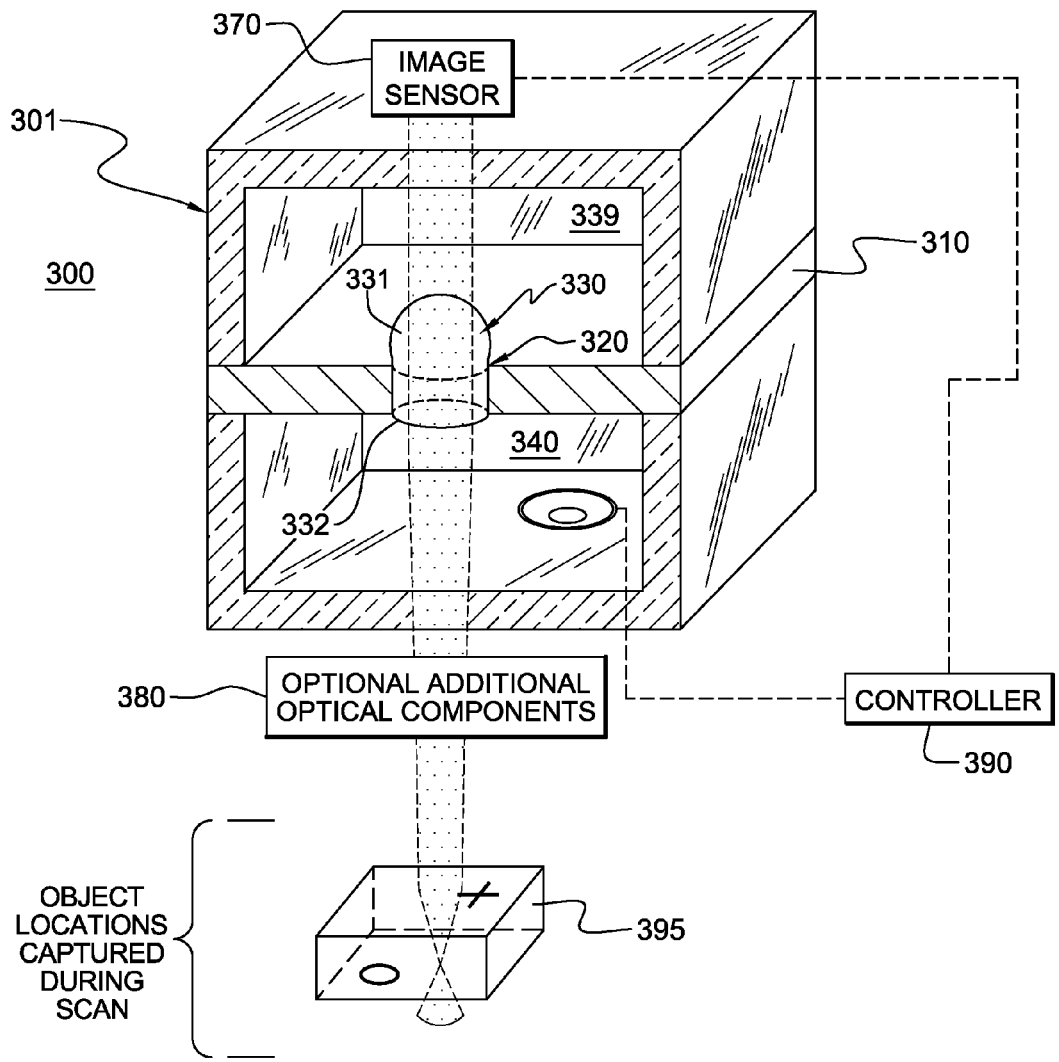
FIG. 4A depicts the imaging system of FIG. 3A, with another image plane, namely the bottom surface of an object, being illustrated as imaged in focus (by way of example), in accordance with an aspect of the present invention.

FIG. 4A again depicts the imaging system 300 of FIG. 3A, wherein liquid drop 330 has oscillated into a different position relative to the channel 320 in substrate 310, such that the first capillary surface of first droplet portion 331 has expanded within chamber 339, while the second capillary surface of second droplet portion 332 has contracted within chamber 340 in a manner illustrated in FIGS. 2A-2C. Image sensor 370 again images through first droplet portion 331 and second droplet portion 332 of the oscillating liquid lens, as well as any additional optical components 380 to capture all objects within the image scan range through one period of oscillation of the liquid lens. In the example of FIG. 4A, the bottom surface of object 395 is assumed to be at the instant focal plane (by way of example only). Controller 390 (which can readily be programmed by one of ordinary skill in the art) includes logic to sort through multiple images based on one or more image criteria, such as image focus quality, in order to select one or more captured images as a final image.

Figure 4B:
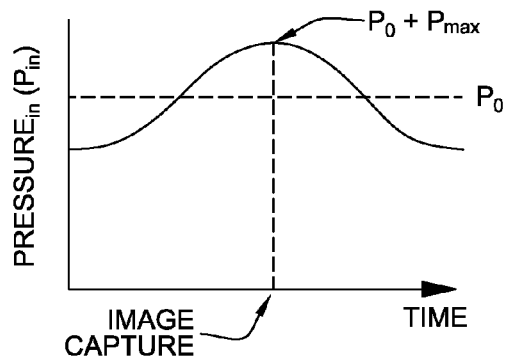
FIG. 4B graphically depicts harmonically-applied pressure versus time to the liquid drop in the liquid lens of FIG. 4A, in accordance with an aspect of the present invention.

In FIG. 4B, a graph of the applied pressure oscillation is depicted, with image capture being represented in this example as occurring at a maximum displacement, that is, at $P_o+P_{max}$, where $P_{max}$ is the maximum amplitude of the harmonic pressure applied to the liquid drop constrained within the channel of the substrate.

For supporting analysis, the dynamics of harmonically driven liquid lenses were studied experimentally using a device consisting of a hole with a diameter of 2R=1.68 mm drilled in a 1.82 mm thick Teflon plate filled with a water drop. The hydrophobic nature of Teflon, together with the sharp edges of the hole, ensured good pinning. On one side of this Teflon plate was a chamber connected to a speaker that produced a sinusoidal driving pressure. (Note that the sinusoidal driving pressure described herein was selected by way of example only. The driving pressure employed within the oscillating liquid lens may be any harmonic or non-harmonic driver, including a sine, cosine or other periodic oscillation about an ambient or equilibrium condition.) The pressure inside the chamber was measured using a transducer (Setral model 264 with a pressure range of ±0.5 inch water and a National Instruments model USB-6009 DAQ card). The frequency of the measured pressure signal was found to be identical to the frequency of the input to the speaker and the phase was essentially the same. This confirms that the frequency response of the pressure transducer was adequate for the experiments. The amplitude of the pressure transducer was calibrated against a precision integrating sound level meter (Brüel and Kajaer, model 2230) together with a microphone (Brüel and Kajaer, model 4155) and a 20 dB attenuator (Brüel and Kajaer, model cf0020). The calibration of the meter was checked against a 124 dB piston phone calibrator (Brüel and Kajaer, model 4220). The pressure transducer output was calibrated against two separate sound level meters and the error was found to be less than 5% for all cases.

Figure 5A:
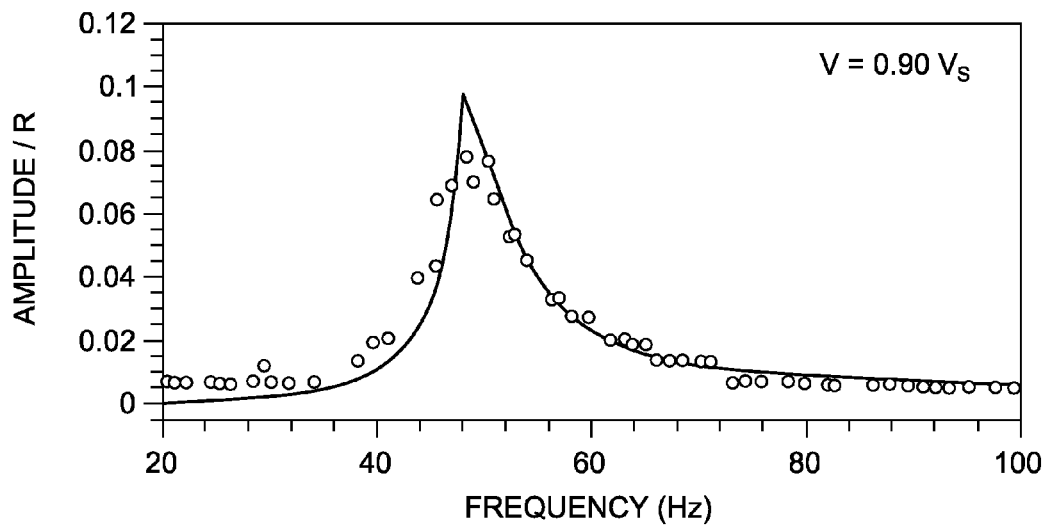
FIG. 5A is a graph of droplet response in terms of amplitude of motion versus frequency for one embodiment of a pinned-contact oscillating liquid lens, in accordance with an aspect of the present invention.

The lumped mass model for spherical caps developed by Theisen et al. (Dynamical Model of the Capillarity-Driven Droplet Switch, J. Fluid Mechanics, 580, pp. 495-505 (2007)) was used to describe the dynamics of the liquid lens. Although more rigorous models could be developed, the lumped mass model was used because experimentally the droplets were observed to remain spherical unless the system was driven at large amplitudes (for quantitative measurements with the 1-mm scale lens, the driving pressure never exceeded 25 Pa, that is, $2.5 \times 10^{-4}$ atm). To compare the model predictions with the experiment, the amplitude of the liquid lens motion for a given frequency was measured using a long-time exposure picture (0.05 s) taken from the side of the liquid lens. This picture was compared to one where the lens was in equilibrium and the distance traveled by the apex of each droplet was determined. FIG. 5A shows the amplitude of motion of the bottom droplet apex as a function of frequency for a lens with the volume of $V=0.9 V_s$, where the forcing pressure amplitude had an average value of 2.5 Pa ($2.5 \times 10^{-5}$ atm) in that frequency range. The displacement is scaled by the radius of the channel or hole, R, with the measured resonant frequency in this case being 49 Hz.

Figure 5B:
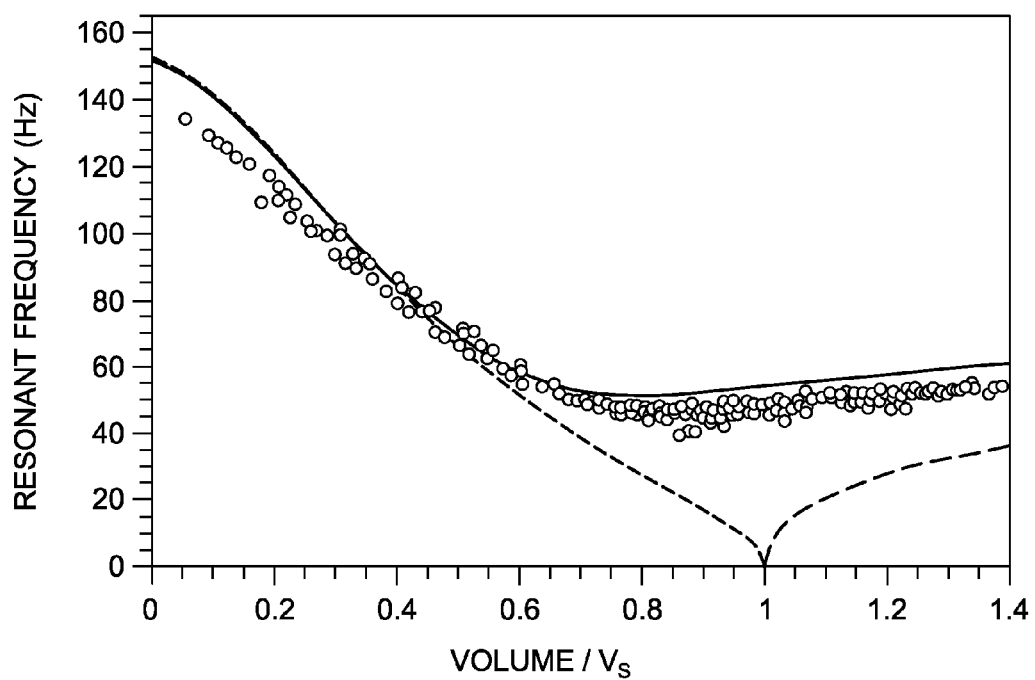
FIG. 5B is a graph of resonant frequencies for a range of liquid drop volumes, wherein the dashed curve represents predicted resonant frequency in the absence of gravity and the solid curve predicted resonant frequency with gravity, and wherein the sample points represent experimental measurements, in accordance with an aspect of the present invention.

FIG. 5A shows that the predicted amplitude of the motion agrees with the measurements to well within experimental uncertainty. The primary source of the uncertainty was quantization of the droplet shape on the imaging system. FIG. 5B shows the measured and predicted resonant frequencies for a range of volumes. The prediction in FIG. 5B was obtained by linearizing equation (1) below about the equilibrium position of the system. The dashed curve depicts the predicted resonant frequency in the absence of gravity, and the solid curve is the prediction with gravity. The circle symbols represent experimental measurements. As can be seen, agreement is excellent for volumes between 0.3 and 0.8 $V_s$. For smaller volumes the predicted resonant frequency is higher, because increased viscous dissipation makes the maximum response occur at a lower frequency. For larger volumes, the resonant frequency is also lower than predicted, as large drops sag noticeably as a result of gravity.

$$\frac{d^2}{d^2}(V_T Z_{cm}) = \frac{3}{2}\left(\frac{1}{R_b} - \frac{1}{R_t}\right) + 6\text{Re}^{-1} Lf - BV_T + \frac{3}{4} P_e \sin(\Omega t) \quad (1)$$

In this model, all lengths are scaled by the channel radius R, and time is scaled using the intertial-capillary timescale $\tau = \sqrt{\rho R^3 / \sigma}$ where $\rho$ is the density and $\sigma$ is the surface tension of the liquid. $V_T$ represents the total volume scaled by the volume of a sphere of radius, R, $R_t$ and $R_b$ respectively represent the top and bottom radius number, v is the kinematic viscosity, 2 L is the length of the channel joining the droplet portions (that is, the substrate thickness), and f is the dimentionless viscous force arising from the fluid flow in the tube. $B=(\rho g R^2/\sigma)$ is the Bond number, where g is the acceleration of gravity, $P_e$ and $\Omega$ represent the non-dimensional magnitude and frequency of the forcing pressure, respectively. For comparison with experimental results, equation (1) above was numerically solved for a long enough time such that initial transients had disappeared and the measured value of the forcing pressure was used for $P_e$. Standard values of properties of water at 22° C. were used for the computations.

Figure 6A:
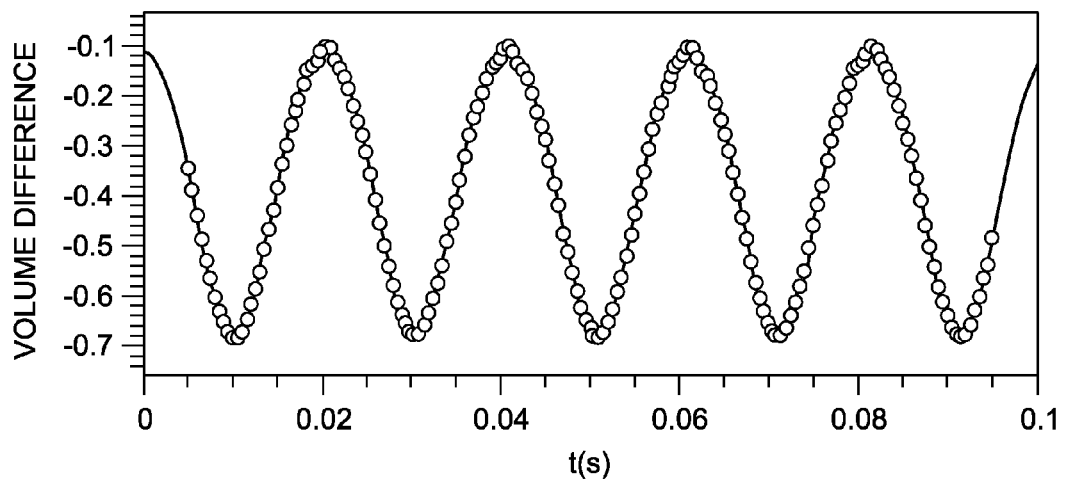
FIG. 6A depicts predicted and measured motion of a pinned-contact oscillating liquid lens, wherein the solid line is the predicted value, and the circles represent measured values, in accordance with an aspect of the present invention.
Figure 6B:
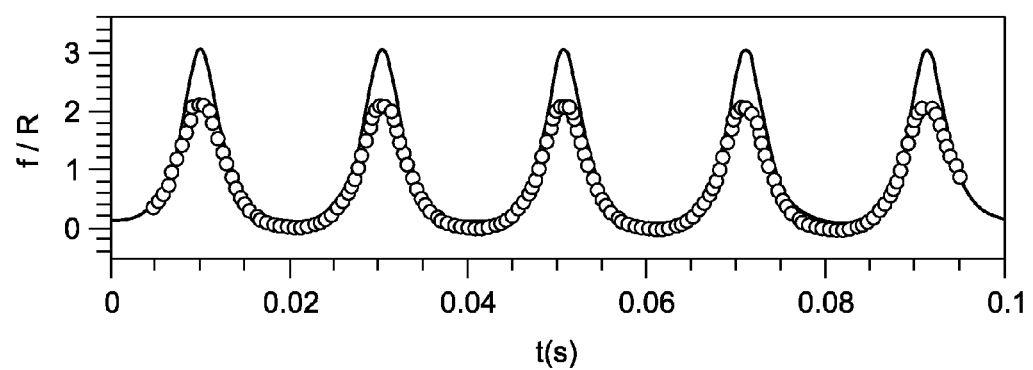
FIG. 6B is a graph of predicted and measured focal lengths as a function of time for a pinned-contact oscillating liquid lens, with the solid line illustrating the focal length computed using the predicted position of the lens' center of mass, and the circles illustrating experimental measurements, in accordance with an aspect of the present invention.

FIG. 6A shows perfect agreement between measurements and predicted motion of a liquid lens in terms of volume difference between the two protruding droplet portions, with a total protruding volume of 0.9 $V_s$, forced at a frequency of 49 Hz and an amplitude of 8 Pa ($7.9 \times 10^{-5}$ atm). In FIG. 6A, the circles represent actual measurements, and the solid line is the value predicted by solving equation (1) above. In the theoretical model, the volume difference between the two protruding droplet portions defines the geometrical configuration in its entirety. The predicted volume difference between the two protruding droplet portions mass allows determination of the expected focal length at any instant by using Snell's Law. To experimentally determine the focal length from the lens shape, a high-speed video of the side view, perpendicular to the optical axis, was captured. The video camera (Redlake Motion Pro HS2-C-4) was used with a zoom lens (Thales-Optem 70XL, together with a 1.5× objective, and a 1×TV tube). The video camera was activated using a trigger signal that was digitized simultaneously with the pressure signal, making it possible to synchronize each captured frame with the pressure wave. For each frame, the shape of the air/liquid interface was extracted using edge detection software. Circles were fitted to the apexes of the top and bottom droplets to experimentally determine the focal length. The measured forward focal length for a lens of V=0.9 VS is plotted in FIG. 6B, together with the expected value, showing good agreement. (In FIG. 6B, the solid line illustrates the predicted focal length, while the circles represent experimental results.)

Figure 7A:
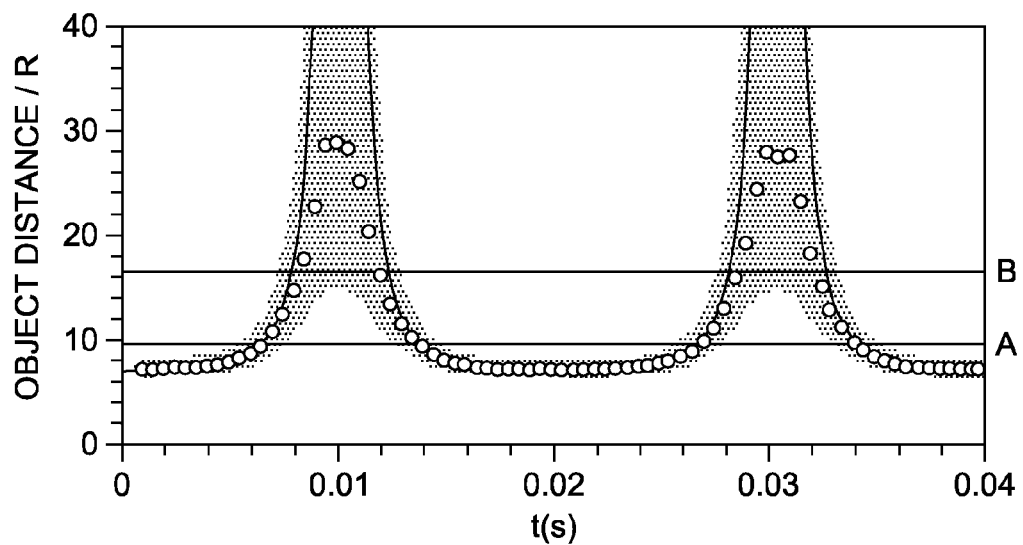
FIG. 7A is a graph of measured object distances, shown by circles, plotted against the predicted solid line value, and scaled by the radius R of the liquid drop as a function of time, in accordance with an aspect of the present invention.
Figure 7B:
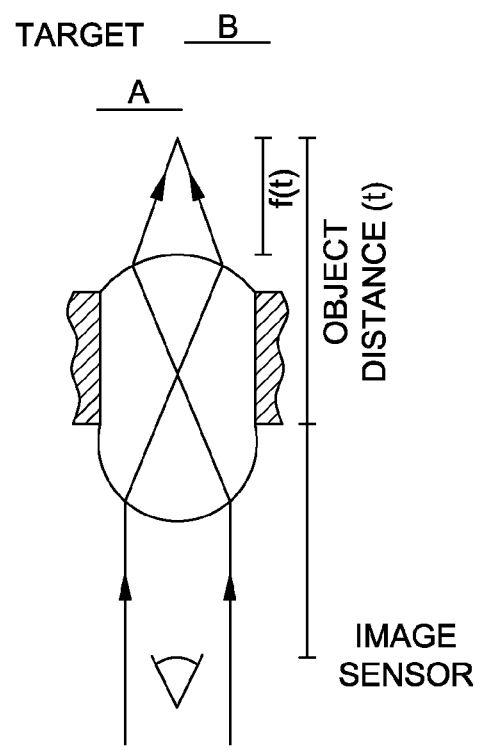
FIG. 7B is a partial schematic illustrating focusing of a pinned-contact oscillating liquid lens, in accordance with an aspect of the present invention.

The focal length is defined based on the distance from a droplet apex, placing it in a moving frame of reference. Object distance, on the other hand, is a more useful quantity as it describes where the focus is actually taking place, because it is measured from a fixed location (the bottom of the Teflon plate in the experimental case). It is computed using the value of the focal length and the chosen position for the camera. The solid curve in FIG. 7B shows the predicted distance at which an object will be in focus at any given instant, together with the measured value. The lens motion scans focal planes along the direction of the optical axis as it undergoes its oscillations. To confirm this behavior independently, a second recording was made by imaging directly through the liquid lens. As illustrated in FIG. 7B, the camera saw letters of the alphabet positioned at two distinct distances from the lens come in and out of focus, according to the instantaneous lens shape. When the object distance equaled the target distance, the target was in focus.

Figure 7C:
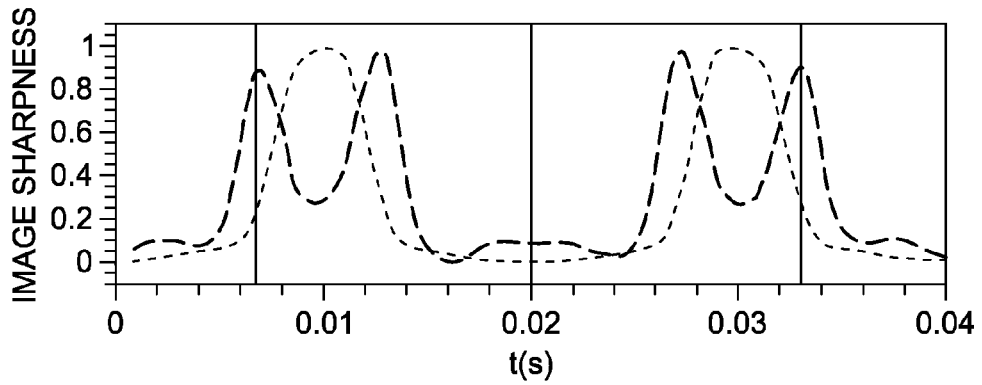
FIG. 7C is a graph of the sharpness of each target in FIG. 7B at a given instant, scaled so that the maximum value is 1, with the dotted curve illustrating sharpness of target A, and the dashed curve illustrating sharpness of target B, wherein the peaks in the image sharpness occur when the location of the target is within the depth of focus, in accordance with an aspect of the present invention.

The degree to which the target is in focus was determined spectrally by using the Fourier transform of the captured images. A focused image has large high-frequency modes in its spectrum due to the sharp edges, whereas an out-of-focus image does not, because these tend to be blurry and smooth. The norm of these high-frequency modes is a convenient measure of the image sharpness. The image sharpness for targets A and B is shown in FIG. 7C. Target A comes in focus twice each period, once when the lens travels forward and once when it is traveling back. Target B, on the other hand, is in focus only once per period and for a longer time, even though the focal plate goes through the target twice. The reason is that changing the focal length also changes the depth of focus, represented as the shaded region in FIG. 7A. When the target is within the shaded region, it appears in focus, independent of the actual position of the focal plane. These data demonstrate that once the motion of one period has been computed, it can be used to predict the subsequent dynamics of the lens. The depth of focus was computed by assuming that a 0.1R radius disk is an acceptable image of a point source.

To demonstrate the imaging quality of the oscillating liquid lens, a standard-resolution target (USAF 1951 positive target, Edmund Optics NT38-257) was placed essentially at position A and imaged directly using the lens. For this case, two peaks in image sharpness occurred in each period. One snapshot (t=0.007 s) was obtained during the second peak of the second period (t=0.033 s), which again confirms the periodicity of the motion. Another snapshot (t=0.020 s) was obtained as an out-of-focus image, but of course another region of the scan range was in focus at that instant.

Figure 8:
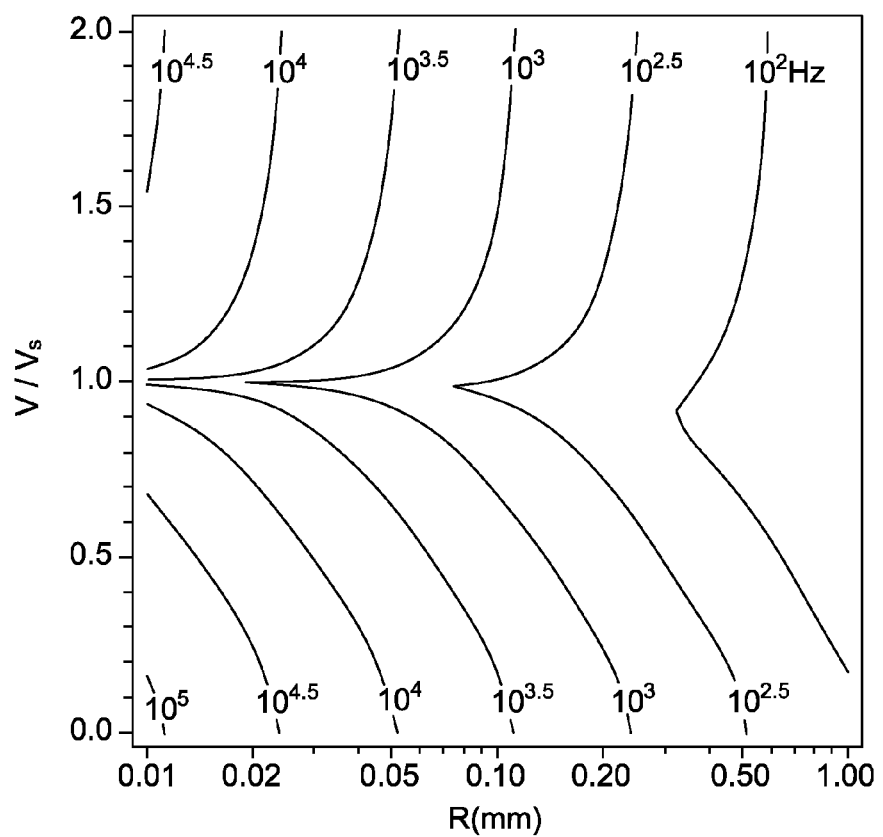
FIG. 8 is a graph of frequency response of a pinned-contact oscillating liquid lens, wherein constant frequency contours are plotted in the radius-volume plane, and the plots illustrate that as the liquid lens is scaled down two orders of magnitude in size, the frequency response increases by three orders of magnitude, as expected, in accordance with an aspect of the present invention.

The theoretical frequency response of pinned-contact oscillating liquid lenses is mapped out in FIG. 8. The figure shows isocontours of resonant frequency as a function of the scale of the liquid lens (R) and liquid volume (non-dimensionalized by $V_s$). As expected, high frequencies are achieved at smaller scales. For a given scale, the maximum frequency occurs at volumes approaching zero. Furthermore, as the length scale decreases, the effect of gravity diminishes, which results in the appearance of a low-frequency cusp. When gravitational effects are negligible, the cusp occurs at a volume of 1 $V_s$ and slightly smaller volumes at scales presented in FIG. 8 (10 μm to 1 mm) are realizable with water. Theory predicts that such liquid lenses produce resonant frequencies as high as 100,000 Hz. Length scales of order 1 μm and smaller are not considered here because (a) the viscosity becomes dominant at small scales and (b) the wavelength of visible light is approached. FIG. 8 was made based on a dimensionless plate thickness of 2L/R=2.17. This value corresponds to the dimensions of the liquid lens measurements presented here.

Figure 9:
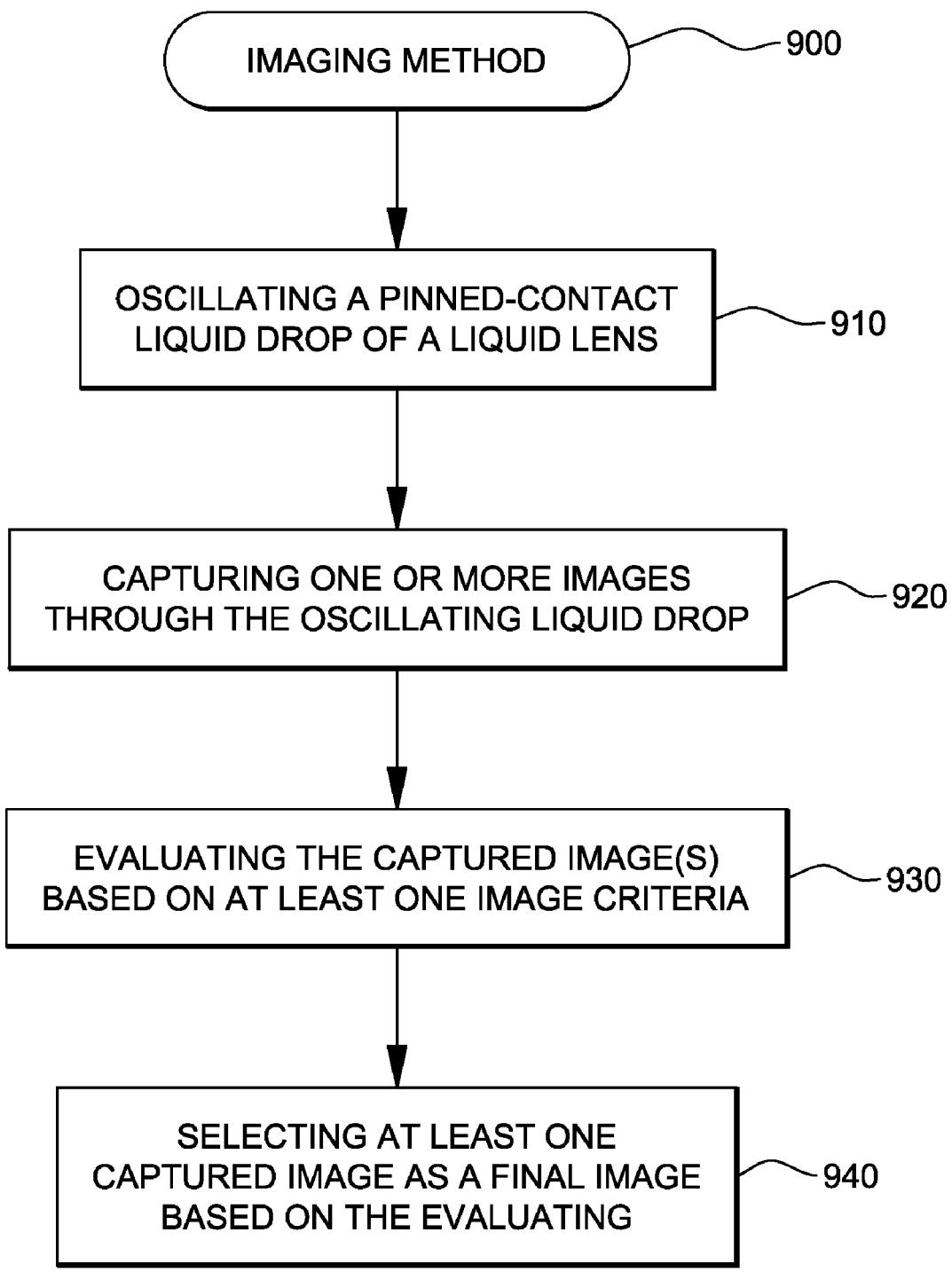
FIG. 9 is a flowchart of one embodiment of an imaging method employing an oscillating liquid lens, in accordance with an aspect of the present invention.

FIG. 9 illustrates one embodiment of an imaging method employing an oscillating liquid lens, such as described herein. The imaging method 900 includes oscillating a pinned-contact liquid drop of a liquid lens such as described herein 910, and while oscillating the liquid lens, capturing one or more images through the oscillating liquid drop 920. Specifically, the one or more images are captured through the first droplet portion and second droplet portion of the drop, which extend above the first and second surfaces, respectively, of the substrate defining the channel within which the liquid drop resides. The captured images are forwarded to a controller, which comprises (in one embodiment) a computer that includes logic to evaluate 930 the captured images based on one or more image criteria, such as sharpness of the image. Evaluation of digital images can be readily accomplished by one skilled in the art using, in part, existing image analysis software. One or more captured image(s) is then selected as one or more final image(s) based on the evaluating 940. Depending upon the implementation, the final images may be combined into a 3D representation of an object.

Those skilled in the art will note that the pinned-contact oscillating liquid lens described herein provides a novel solution for imaging systems where fast changes in focal length are sought. The activation of a properly designed liquid lens requires only a small pressure source (for example, it can be made to function using a small speaker), which along with a driving circuit, can be readily manufactured in a small and lightweight package. Furthermore, there is no need for high voltages or other exotic activation mechanisms, making many applications of the liquid lens feasible.

Disclosed herein is a demonstration of a harmonically-driven liquid lens with an oscillating focal length that can capture any image plane in a given range at the resonance of the oscillations. The lens features two droplet portions coupled through a cylindrical hole (or channel), with pinned-contact lines against a hydrophobic substrate. The change in the curvature of the droplet portions induces a change in focal length. The opposing curvature of the droplets creates a spring-like force that makes the system a natural oscillator. As image capture timing is electronic, it can be achieved rapidly, so that the frequency response of the lens is only limited by its resonant frequency. Thus, the liquid lens presented is a coupled-droplet system which can be made to oscillate at resonance with very little input and low pressure amplitude in the range of $10^{-6}$ to $10^{-4}$ atmospheres. When the oscillation is fast enough, the lens can be thought of as always being very close in time to being at the desired focal length; hence the idea of fast-focusing behind the liquid lens presented.

At a scale that is small enough so that gravity is not dominant, the coupled-droplet liquid lens disclosed herein with pinned contact lines balances fluid inertia against surface tension, and the system can be made to oscillate. The size of the droplets must not be so small that they are susceptible to viscous dissipation, and not too big, as this introduces significant gravitational effects. Experimental results have illustrated that a millimeter-scale liquid lens is practical.

Those skilled in the art will note that the coupled-droplet system presented can be applied in a number of applications, including mobile phones, video recorders, and other small, lightweight consumer products with video recording capabilities. A mobile phone is a particularly good example, where everything needed to activate the liquid lens is readily packaged, including a speaker that can provide the oscillatory driving pressure. Other applications are autonomous, micro-air-vehicles for surveillance and defense, which would benefit from imaging capabilities in many directions rather than just vision straight ahead (or below). The relatively small size and high energy efficiency of the liquid lens presented suits the installation of several of these lenses in such a small vehicle to realize imaging in all directions at all times.

As will be appreciated by one skilled in the art, aspects of the controller described above may be embodied as a system, method or computer program product. Accordingly, aspects of the controller may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the controller may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A liquid lens comprising:
a substrate defining at least one channel extending through the substrate between a first surface and a second surface thereof;
for each channel of the at least one channel, a liquid drop disposed within the channel, each liquid drop comprising a first droplet portion with a first capillary surface protruding away from the first surface of the substrate, and a second droplet portion with a second capillary surface protruding away from the second surface of the substrate, the first droplet portion and the second droplet portion being connected through the channel; and
an oscillator operatively coupled to at least one of the first droplet portion or the second droplet portion for oscillating the liquid drop within each channel of the at least one channel.

2. The liquid lens of claim 1, wherein for each channel of the at least one channel, the respective liquid drop fills the channel, and wherein the oscillator operatively coupled to the at least one first droplet portion or second droplet portion continuously or intermittently oscillates the liquid drop within the channel, and hence, the first droplet portion and the second droplet portion of the liquid drop.

3. The liquid lens of claim 1, wherein the oscillator is operatively coupled to at least one of the first droplet portion or the second droplet portion for oscillating the connected first and second droplet portions at the liquid drop's resonant frequency.

4. The liquid lens of claim 1, wherein the liquid drop comprises at least one of water, an aqueous salt solution, or an aqueous ferro-fluid.

5. The liquid lens of claim 1, further comprising at least one transparent housing disposed over at least one of the first droplet portion or the second droplet portion of the liquid drop in each channel of the at least one channel.

6. An imaging system comprising:
a liquid lens comprising:
a substrate defining at least one channel extending through the substrate between a first surface and a second surface thereof;
for each channel of the at least one channel, a liquid drop disposed within the channel, each liquid drop comprising a first droplet portion with a first capillary surface protruding away from the first surface of the substrate, and a second droplet portion with a second capillary surface protruding away from the second surface of the substrate, the first droplet portion and the second droplet portion being connected through the channel; and
an oscillator operatively coupled to at least one of the first droplet portion or the second droplet portion for oscillating the liquid drop within the channel; and
at least one image sensor coupled to at least one image path passing through the first and second droplet portions of the oscillating liquid drop in the at least one channel for capturing an image through the first and second droplet portions of the oscillating liquid drop.

7. The imaging system of claim 6, wherein the at least one image sensor is operatively coupled to the at least one image path for capturing an image through the first and second droplet portions of each oscillating liquid drop while the first and second droplet portions of the liquid drop are continuously or intermittently oscillating.

8. The imaging system of claim 7, wherein the at least one image sensor is coupled to the at least one image path for capturing an image through each connected first and second droplet portions while the first and second droplet portions are oscillating at the liquid drop's resonant frequency.

9. The imaging system of claim 6, wherein the first surface and the second surface of the substrate are non wetting.

10. The imaging system of claim 6, further comprising a controller coupled to the oscillator and configured to control oscillations of the liquid drop within each channel of the at least one channel.

11. The imaging system of claim 6, wherein the oscillator is operatively coupled to one of the first droplet portion or the second droplet portion of the liquid drop in each channel of the at least one channel via one of air pressure or a ferro-fluid drive.

12. The imaging system of claim 6, wherein at least one of the first droplet portion or the second droplet portion interfaces with a gas above the first surface or the second surface of the substrate, respectively, and wherein the liquid lens is a pinned-contact oscillating liquid lens.

13. The imaging system of claim 6, wherein the at least one image sensor captures the image in less than a period of oscillation of the liquid drop through which the image is captured.

14. The imaging system of claim 6, further comprising at least one transparent housing disposed over at least one of the first droplet portion or the second droplet portion of the liquid drop in each channel of the at least one channel.

15. An imaging method comprising:
oscillating a liquid lens, the liquid lens comprising a substrate defining a channel extending between a first surface and a second surface thereof, with a liquid drop being disposed within the channel, the liquid drop comprising a first droplet portion including a first capillary surface protruding away from the first surface of the substrate and a second droplet portion comprising a second capillary surface protruding away from the second surface of the substrate, wherein the first and second droplet portions of the liquid drop are connected through the channel, and the oscillating comprises applying oscillatory force to at least one of the first droplet portion or the second droplet portion to oscillate the liquid drop within the channel; and
capturing at least one image via an image path passing through the first and second droplet portions of the oscillating liquid drop.

16. The imaging method of claim 15, further comprising:
capturing multiple images through the first and second droplet portions of the oscillating liquid drop;
evaluating the captured images based on at least one image criteria; and
selecting at least one captured image as a final image based on the evaluating.

17. The imaging method of claim 16, wherein the capturing occurs across a period of oscillation of the oscillating liquid lens and the evaluating comprises selecting at least one infocus image from the multiple images.

18. The imaging method of claim 15, wherein the oscillating comprises imparting one of a harmonic oscillation to the first and second droplet portions of the liquid drop, or a non-harmonic oscillation to the first and second droplet portions of the liquid drop.

19. A method of fabricating a liquid lens comprising:
obtaining a non wetting substrate;

defining at least one channel in the non wetting substrate extending from a first surface to a second surface thereof; and for each channel of the at least one channel defined in the non wetting substrate, disposing a liquid drop within the channel with a first droplet portion comprising a first capillary surface protruding away from the first surface of the substrate and a second droplet portion comprising a second capillary surface protruding away from the second surface of the substrate, wherein the first and second droplet portions of the liquid drop are connected through the channel.

20. The method of fabrication of claim 19, further comprising operatively coupling an oscillator to one of the first droplet portion or the second droplet portion within each channel of the at least one channel in the non wetting substrate for oscillating the liquid drop within the channel, and hence, the first and second droplet portions of the liquid drop, wherein oscillation of the liquid drop facilitates capture of images through the liquid lens at different focal lengths.

* * * * *